No. 818,488. PATENTED APR. 24, 1906.
S. W. TONRY.
BICYCLE TRACK.
APPLICATION FILED JAN. 20, 1905.

Witnesses.
Robert Everitt,
S. E. Stanford.

Inventor.
Stephen W. Tonry.
By Geo. W. Rea.
Att'y.

UNITED STATES PATENT OFFICE.

STEPHEN W. TONRY, OF BROCKTON, MASSACHUSETTS.

BICYCLE-TRACK.

No. 818,488.  Specification of Letters Patent.  Patented April 24, 1906.

Application filed January 20, 1905. Serial No. 242,000.

*To all whom it may concern:*

Be it known that I, STEPHEN W. TONRY, a citizen of the United States, residing at Brockton, in the county of Plymouth and State of Massachusetts, have invented a new Bicycle-Track, of which the following is a specification.

My invention relates to an improvement in bicycle-tracks intended chiefly for exhibition or theatrical performances.

To this end the invention consists, generally, in a tilted bodily-movable track; secondly, in such a track of "banked" type, and, thirdly, in the association with such track of means for rotating the same in a direction opposite that of the travel of the rider and independently of the rider.

That which is regarded as new will be set forth in the clauses of claim appended to the accompanying description of the invention.

My invention is illustrated in the accompanying drawings, in which—

Figure 1:
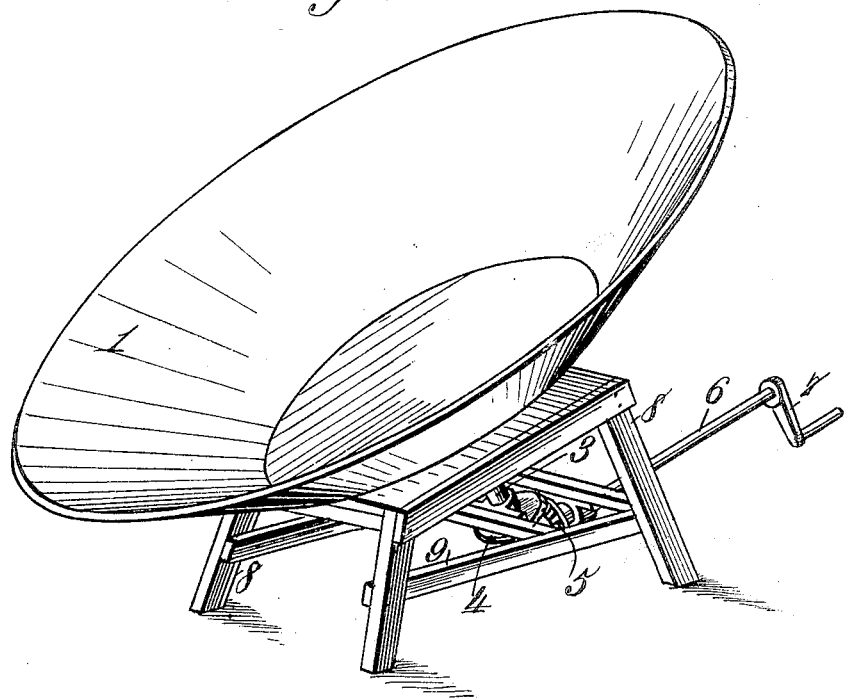
Figure 2:
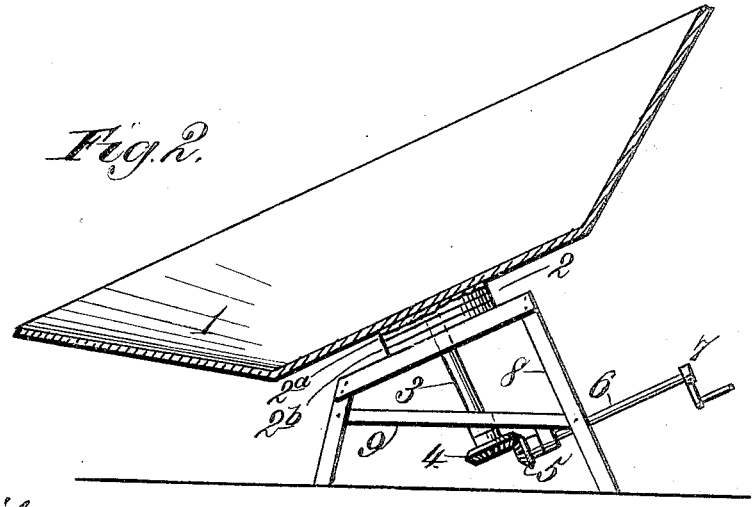

Figure 1 is a perspective view of a bicycle-track embodying my invention. Fig. 2 is a sectional view.

In the said drawings the reference-numeral 1 indicates a bicycle-track having a riding-surface upon which the rider of a bicycle may travel his machine, and, as preferred and shown, this track is of the banked type—that is to say, it is a flaring track, providing a riding-surface inclined to the perpendicular of the earth. This track forms part of a turn-table 2, one member 2$^a$ of which is connected to the track proper and the other member 2$^b$ to the support upon which the track is mounted, and associated with the track are devices or gearing whereby the track may be rotated, such devices or gearing in the present example of the invention consisting of a shaft 3, connected to the track proper or the element of the turn-table 2$^a$, forming a part of the track proper and provided with a pinion 4, with which meshes a pinion 5 on the shaft 6, provided with a crank-handle 7 to facilitate manual rotation, whereby by an operator the track may be rotated in the plane of the circuit of the riding-surface of the track—for example, in a direction opposite the intended travel of the bicycle-rider, retarding his speed because of the fact that the surface upon which he travels has a movement in a direction opposite to that of his intended travel.

The track, as shown, preferentially is a banked track, whereby the rider, as is desirable in a theatrical or test experiment, may ride in a circle with greater facility and greater speed than he could upon a horizontal track.

The structure upon which the track is mounted, as shown, preferentially supports the track at an inclination to the horizontal, whereby irrespective of and independently of the means for manually rotating the track the weight of the rider alone and the action of his wheel will as he moves from what is for the time being the lowermost portion of the track to the uppermost portion thereof impart automatically an impulse or movement to the track in a direction opposite that in which he is propelling his wheel, whereby his speed is decreased. The supporting structure is shown as consisting of a trestle having legs 8 and cross-bases 9, one pair of legs being of greater length than the other, whereby the table or platform of the trestle is arranged at an angle to the horizontal, as shown, and whereby the track is mounted for rotation at an angle to the horizontal.

By my invention I provide an improved bicycle-track chiefly intended for exhibition tests or theatrical performances, whereby automatically in the act of traversing the track the speed of the rider will be retarded and whereby, secondly, by manual or other means combined with the track the said track may be rotated in opposition to the intended travel of the rider to retard his speed of actual travel for the purpose of testing his speed as against the motive power for moving the track in opposition to him.

The foregoing are illustrative examples of uses inherent in my invention. It will be understood, of course, that I do not limit my invention to such uses, but claim the arrangement of track for all the uses to which it may be adapted.

Having thus described my invention, what I claim is—

1. A banked bicycle-track mounted upon an axle and rotatable in the plane of the circuit of the riding-surface.

2. A bicycle-track mounted upon an axis at an angle to the horizontal and rotatable in the plane of the circuit of the riding-surface.

3. A banked bicycle-track mounted upon an axis at an angle to the horizontal and rotatable in the plane of the circuit of the riding-surface.

4. A banked bicycle-track mounted upon an axis and rotatable in the plane of the circuit of the riding-surface, and means for rotating the same.

5. A bicycle-track rotatably mounted upon an axis at an angle to the horizontal, and means for rotating the same about said axis.

6. A banked bicycle-track rotatably mounted upon an axis at an angle to the horizontal, and means for rotating the same about said axis.

In testimony whereof I have signed my name to this specification in the presence of two subscribing witnesses.

STEPHEN W. TONRY.

Witnesses:
MAURISE J. KEARNEY,
CHARLES E. BUTTS.